UNITED STATES PATENT OFFICE.

JOE OLGIERD ZDANOWICH, OF LONDON, ENGLAND.

PROCESS FOR THE MANUFACTURE AND PRODUCTION OF CELLULOSE ACETATES.

1,347,801.     Specification of Letters Patent.     Patented July 27, 1920.

No Drawing.     Application filed May 5, 1920. Serial No. 379,174.

*To all whom it may concern:*

Be it known that I, JOE OLGIERD ZDANOWICH, a subject of the King of Great Britain and Ireland, and residing at 24 St. James' street, London, S. W. 1., England, have invented a certain new and useful Process for the Manufacture and Production of Cellulose Acetates, of which the following is a specification.

Many attempts have been made to substitute the sulfuric acid used as contact, or condensing agent, in conjunction with glacial acetic acid and acetic anhydrid in the manufacture of cellulose esters, on account of its high splitting action on cellulose. It has been already suggested to use the organic aliphatic or aromatic acids, and among others the mono-di- and tri-halogenacetic acids yet on account of their being weak acids, their action is very slow, although employed in very large quantity (see British Patent 14,255/06) when it probably partly replaces the solvent, that is acetic acid.

Now I have found out that when these acids are made to react in an acetylating mixture in their nascent state, that is when they are produced in an acetylating mixture in the presence of cellulose, their action is totally different, they react more energetically, even at a low temperature, and have no injurious effect on the molecule of cellulose at high temperatures. In about two hours' time from the beginning of their formation, by any of the known processes, in an acetylating mixture consisting of glacial acetic acid and acetic anhydrid, at a temperature of about 70° the mono- and di-acetates of cellulose are formed, but after this point has been reached, the esterification is too slow, to be of appreciable advantage in the manufacture on very large scale. Now I have found out that if at this stage a few drops only of sulfuric acid, or any other strong acid, or compound, such as chloro-sulfonic acid are added, in about one or two hours' time the esterification of cellulose is complete, the cellulose entirely enters into a clear colorless solution of extremely high viscosity. When this solution is poured on a plate, it gives a film of an exceptional transparency, strength and elasticity, far exceeding those hitherto known and can be directly used for making films, squirted through fine orifices for making artificial silk, horsehair and the like. Now this solution essentially differs from all the other known for, when the said solution of acetates in the acetylating mixture is precipitated in usual way, it does not give a white flocculent precipitate, but a transparent glass-like tenacious material, and when thoroughly washed to neutrality and dried, it was found to be easily soluble, in either chloroform or acetone, and this latter solution, in acetone, when poured on a glass plate, evaporates quickly leaving a perfectly transparent, very tenacious film, and does not turn white, as is frequently the case with other acetates, which property is very much sought for, for making aeroplane dopes for example.

In order to illustrate the new process, the following example may be given:

Into a mixture consisting of: 60 c. c. of acetic anhydrid and 110 c. c. of glacial acetic acid, 20 grams of cellulose is introduced. While stirring, a current of chlorin gas is introduced, either at ordinary temperature or at 60° to 70° C. after about two hours' time, either at this temperature, or at the ordinary temperature some ten or twelve drops of sulfuric acid is introduced the mixture is stirred until it changes into a clear colorless very viscous solution, which can be used for films, artificial silk, varnishes and the like, or can be precipitated, and treated and used in usual way.

I do not intend to confine myself to the particulars given in the above example, which is a typical one, and can be varied within wide limits, without altering thereby the nature of this invention. For example, the amount of sulfuric acid can be 0.5 of 1% only and instead of chlorin the other halogens, bromin for example or compounds capable of producing the condensing or contact agents such as chlorid of bromin can be used. Any kind of cellulose can also be used. The special object of this invention is to submit the cellulose prior to the action of a strong condensing agent to a preparatory weaker one in nascent state, so that a strong one may be used in as small a quantity as possible, in order to complete the esterification.

Now, as an important advantage of this invention my further experiments have proved that in a process previously described the halogen, besides being instrumental for the formation of halogen-acetic acid exercises another action, namely it has a hydrolyzing effect on cellulose, that is, it partly combines with it, and further, the reaction of halogen can be decreased or intensified according to the temperature, duration, and the amount of halogen introduced, varying thereby the formation of nascent hydrocellulose.

The action of halogen upon the acteylating mixture and cellulose is terminated, when a sample of cellulosic ester produced dissolves in pure anhydrous acetone in any quantity.

The acetyl cellulose is then precipitated in ordinary way and it forms a precipitate of snow-white, porous, fragile, glossy (silky) lumps. The esters so produced are most suitable for the manufacture of films, dopes, varnishes, and the like, for they very quickly and readily dissolve in acetone, or mixture of acetone and alcohol, or acetone-alcohol-benzol; in chloroform, or mixture of it with alcohol, and the like, and the films produced from these solutions are perfectly colorless, transparent and possess remarkable degree of tenacity.

Should the action of halogen be interrupted at an earlier stage, and acetyl cellulose be precipitated, by any known way, the precipitate so formed is of horny appearance, transparent, very hard, it does not turn white in water after a considerable sojourn there, or even with the addition of acids, and after being dried remains transparent, and it readily dissolves in chloroform or tetrochlorethane, or in the mixture of either with alcohol.

Therefore before the precipitation of such an acteylating mixture, that is, when all cellulose has passed into a thick, syrupy colorless solution, it can be spun directly, that is squirted through fine orifices, to produce artificial silk, horsehair, and the like.

At this stage the hydrolysis of cellulose acetates, can also be completed, if desired, by the addition of dilute acetic acid, or other acids, or compounds, having analogous action, such as formalhehyde, peroxid of hydrogen and the like.

As a further illustration of my process the following example may be given: Into a mixture of 500 c. c. of glacial acetic acid, and 420 c. c. acetic anhydrid, 150 grams of cellulose is introduced, together with chlorin gas, while stirring, the temperature being about 70° or 80°.

After some two or three hours' time, 2 grams of sulfuric acid is added. The mixture is well stirred until it changes into a clear solution, which can be precipitated in ordinary way, or at this stage in order to complete the hydrolysis about 200 c. c. of formaldehyde or peroxid of hydrogen or an equivalent or equal amount of dilute acetic acid is added, after which the mixture can be precipitated. The chlorin in this example may be replaced by an equivalent amount of bromin or the bromid of chlorin. These esters possess another valuable property, namely; dopes, varnishes, lacquers and the like, prepared by dissolving esters so obtained in (1) acetone or in its mixtures; or (2) in chloroform or in its mixtures, are of very low viscosity, therefore considerable economy is effected in the quantity of solvents used.

In the claims I have used the term "a relatively small quantity" with reference to the amount of esterifying or condensing agent, specifically sulfuric acid, to cover quantities of said agent amounting to not substantially more than 0.5 of 1% of the acetylating mixture.

I am aware of British Specification No. 22,237 of 1911 and do not claim anything described or claimed therein.

Having now described my invention, what I claim as new and desire to secure by Letters Patent is:—

1. A process for the manufacture of cellulose esters which comprises subjecting cellulose to the action of an esterifying mixture comprising an organic acid, adding a halogen to said mixture while maintaining the same at a temperature at which said halogen and said organic acid react forming a halogen organic acid, whereby esterification of said cellulose is initiated and thereafter adding to said mixture a relatively small quantity of a strong esterifying reagent to complete the esterification of said cellulose.

2. A process for the manufacture of cellulose acetates which comprises subjecting cellulose to the action of an acetylating mixture comprising acetic acid, passing chlorin into said mixture while maintaining the same at a temperature at which chlor-acetic acid is formed whereby esterification of said cellulose is initiated, and thereafter adding to said mixture a relatively small quantity of sulfuric acid to complete said esterification.

3. A process for the manufacture of cellulose acetates which comprises introducing cellulose into a mixture of glacial acetic acid and acetic anhydrid at a temperature of from 60° C. to 80° C., passing chlorin into said mixture, and thereafter adding a relatively small quantity of sulfuric acid to said mixture to complete the esterification of said cellulose.

4. A process for the manufacture of cellulose acetates which consists in mixing cellulose with glacial acetic acid and acetic anhydrid in substantially the proportions of 500 cubic centimeters of glacial acetic acid 420 cubic centimeters of acetic anhydrid and 150 grams of cellulose, maintaining said mixture at a temperature of from 70° to 80° centigrade for from two to three hours while passing chlorin thereinto, adding 2 grams of sulfuric acid to the resulting mixture, stirring said mixture until a clear solution is produced, and adding 200 cubic centimeters of formaldehyde to said solution.

5. A process for the manufacture of cellulose esters, which comprises subjecting said cellulose to the action of a weak esterifying mixture comprising a halogen organic acid, and after partial esterification of said cellulose in said mixture adding thereto a relatively small quantity of sulfuric acid.

6. A process for the manufacture of cellulose esters which comprises esterifying said cellulose in an esterifying mixture, and thereafter adding formaldehyde to said mixture whereby said cellulose is hydrolyzed.

7. A process for the manufacture of cellulose acetates which comprises treating cellulose with a mixture of glacial acetic acid and acetic anhydrid, passing chlorin into said mixture, treating the resulting mixture with sulfuric acid, and thereafter adding formaldehyde to said mixture.

8. The process for the manufacture of cellulose acetates which comprises introducing cellulose into a mixture of glacial acetic acid and acetic anhydrid, passing chlorin into said mixture, adding to the reaction product a relatively small quantity of sulfuric acid whereby cellulose acetates are formed, and treating said cellulose acetates with a hydrolyzing agent.

9. A cellulose acetate solution such as may be produced by the herein described process which comprises introducing cellulose into a mixture of glacial acetic acid and acetic anhydrid, passing chlorin into said mixture and thereafter adding a relatively small quantity of sulfuric acid to said mixture, said solution being clear and colorless and of high viscosity and forming upon precipitation a transparent glass like tenacious body of cellulose acetates.

10. Cellulose acetates such as may be produced by the herein described process, which comprises treating cellulose with a mixture of glacial acetic acid and acetic anhydrid, passing chlorin into said mixture, treating the resulting mixture with sulfuric acid, and thereafter adding formaldehyde to said mixture, said cellulose acetates dissolving in acetone, chloroform, a mixture of acetone and alcohol, and a mixture of acetone, alcohol, and benzol to form solutions of low viscosity.

In testimony whereof I have signed my name to this specification.

JOE OLGIERD ZDANOWICH.